Nov. 1, 1949 G. M. SCHANTZ 2,486,721
AIR CLUTCH CONTROL
Filed March 27, 1945
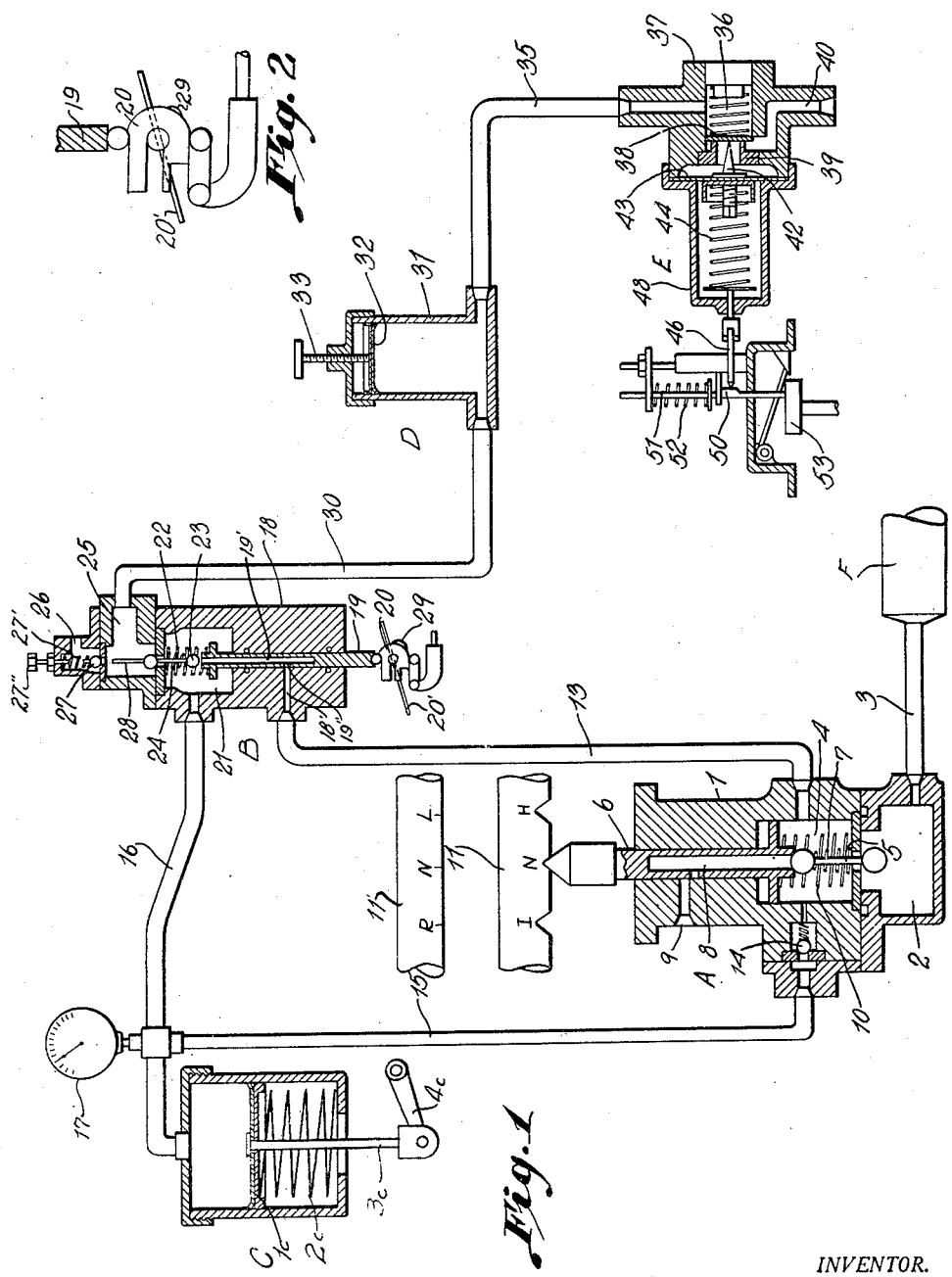
INVENTOR.
GORDON M. SCHANTZ
BY
Hogue, Neary & Campbell
his ATTORNEYS Patented Nov. 1, 1949

2,486,721

UNITED STATES PATENT OFFICE 2,486,721

AIR CLUTCH CONTROL

Gordon M. Schantz, Allentown, Pa., assignor to Mack Manufacturing Corporation, New York, N. Y., a corporation of Delaware Application March 27, 1945, Serial No. 585,174

10 Claims. (Cl. 192—.052)

This invention relates to an improved and simplified automatic clutch control.

Prior automatic clutch control systems included a plurality of shifter valves under the control of both a first speed and reverse shifter rod and an intermediate and high shifter rod as one element of control, a throttle controlled valve mechanism as another, and a governor controlled valve as a third.

One of the objects of this invention is to provide an effective clutch control system employing only the intermediate and high shifter rod as a shifter valve control, thereby greatly simplifying the control mechanism, and employing a variable volume reservoir for permitting the clutch to move to a point just clear of engagement when the throttle is opened and a governor controlled discharge valve to effect complete engagement of the clutch at a predetermined speed of the engine.

Other objects of the invention will appear from the following description of the invention in connection with the figures on the drawing.

Figure 1 illustrates an automatic clutch control system, and

Figure 2 is a view on a larger scale of the throttle cam.

The system comprises a shifter valve mechanism A, a throttle controlled valve mechanism B, a clutch operating cylinder C, a variable volume reservoir D, a governor controlled discharge valve mechanism E and a fluid supply reservoir F. The parts in the drawing are shown in the position they occupy when the gear shift mechanism is in neutral position, and the engine at rest and the clutch disengaged.

The clutch operating cylinder C comprises the usual piston 1c urged by a spring 2c to engage the clutch by raising the piston rod 3c and rocking the clutch operating arm 4c clockwise.

The shifter valve mechanism comprises a valve casing 1 provided with an inlet chamber 2 into which fluid under pressure is supplied through a pipe 3 from a reservoir F. The valve casing is provided with an inner valve chamber 4 connected by a port to the inlet chamber 2 controlled by the lower ball of a dumbbell valve 5 the upper ball of which is urged against a valve seat on the lower end of a plunger 6 by a spring 7. The plunger 6 is provided with an axial bore 8 communicating when the plunger is raised with an exhaust port 9 in the valve casing 1. A spring 10 urges the plunger 6 upwardly into engagement with an intermediate and high shifter rod 11 which is provided with a shallow notch N in the neutral position to hold the valve 5 in the position shown in which it admits fluid under pressure into the inner valve chamber 4 and prevents exhaust of the fluid through the port 9. The notches in the intermediate and high positions I and H are deeper to permit the plunger 6 to be raised and the valve 5 to rise and seat the lower ball and shut off the supply from the reservoir, and to unseat the upper ball and connect the chamber 4 to the exhaust port 9. The shifter rod 11' for moving the gear shift mechanism into low and reverse has no notches as it does not control any shifter valve mechanism.

The valve casing 1 is also provided with a port in the wall of the valve chamber 4 connected by a pipe 13 to the throttle controlled valve mechanism B and with another port controlled by an inwardly opening check valve 14 and connected by a pipe 15 with a pipe 16 connecting the throttle controlled valve mechanism B to the clutch operating cylinder C. A gage 17 may be connected to the pipe 16.

The throttle controlled mechanism B comprises a valve casing 18 in which slides a plunger 19 controlled by the throttle cylinder cam 20 which moves counterclockwise as the throttle 20' is opened. The plunger 19 is provided with an axial bore 19' in its upper end opening into the main valve chamber 21 and provided with a lateral port 19" registering in the closed throttle position of the cam with a port 18' in the casing 18 with which the pipe 13 communicates. The plunger 19 is urged against the cam 20 by a spring 22.

The upper end of the plunger 19 constitutes a seat for the lower ball of a dumbbell valve 23 urged downwardly by a spring 24 toward the seat on the end of the plunger 19 to seat the lower ball of the valve thereon when the plunger 19 is raised by the throttle cam 20 as the throttle is opened. The spring 24 holds the upper ball of the valve 23 on its seat when the plunger is in the position shown to prevent discharge of the fluid into a discharge chamber 25. The discharge chamber 25 may be exhausted through a port 26 controlled by a check valve 27 which is urged against its seat by a spring 27' the compression of which is adjusted by an adjusting screw 27" threaded in the upper wall of the discharge chamber 25". The valve 27 may be unseated by an extension 28 on the valve 23 as the plunger 19 and valve 23 are raised by a second rise 29 on the cam 20 upon advancing the throttle into full open position.

The discharge chamber 25 is also ported for communication by means of a pipe 30 with the variable volume pressure reservoir D which may be a cylinder 31. The volume of this cylinder may be varied by a plunger 32 whose stem 33 may be threaded through the end of the cylinder for this purpose.

The variable volume reservoir D is connected by a pipe 35 with the valve chamber 36 of the governor controlled valve E which may be of any desired and suitable construction. As shown, it comprises a valve casing 37 and a spring pressed valve comprising elements 38 and 39 controlling an exhaust port 40. The valve is held in closed position by a member 42 on a diaphragm 43 spring pressed toward the right by a spring 44 bearing at its left end on the head of a movable plunger 46 operable in a housing 48 having a lap joint with the casing 37 and securing the diaphragm 43 on the casing. The plunger 46 is held in the closing position shown when the engine is not running, and when it is idling, by a cam 50 on a rod 51 urged downwardly by a spring 52 against a governor controlled member 53. When the speed of the engine is increased to a predetermined speed, the governor controlled member 53 raises the rod 51 and moves the cam 50 out of the path of the plunger 46, permitting the plunger 46 to move to the left. This permits the spring 44 to expand and lower the pressure on the valve 38, 39 permitting the valve to open and the fluid to discharge through the port 40 into the atmosphere.

Operation

The drawing shows the parts in position when the vehicle is in neutral gear and the engine is at rest.

When the engine is idling, fluid pressure from the reservoir F flows through the shifter valve A, pipe 13, plunger 19 of the throttle valve B and pipe 16 into the clutch cylinder and disengages the clutch. The operator, taking his foot from the accelerator, shifts into low gear. This has no effect on the shifter valve. The operator now presses down on the accelerator to accelerate the speed of the engine. This rocks the throttle cylinder cam 20 and raises the plunger 19 against the lower ball of the valve 23 which prevents additional fluid from entering the clutch cylinder A. This also raises the upper ball of the valve from its seat, permitting fluid to pass into the variable volume reservoir D which is adjusted to take just enough fluid to permit the clutch to move just clear of engagement. At a predetermined speed of the engine, the discharge valve 38, 39 is opened to bleed the reservoir D and clutch cylinder C, permitting the clutch to engage.

In case the vehicle is started under heavy load or resistance sufficient to prevent the governor from opening the discharge valve, the operator will press the accelerator all the way to the floor and move the plunger 19 by means of the second rise 29 on the throttle cam sufficiently far to open the discharge valve 27 to exhaust the clutch cylinder C.

The operator, having started the vehicle, takes his foot off the accelerator preparatory to shifting into intermediate or high gear. This moves the plunger 19 away from the lower ball of the throttle controlled valve 23 and seats the upper ball of the valve 23, thus again permitting fluid to enter the clutch cylinder to disengage the clutch. The operator now shifts into intermediate or high gear. As he shifts, the plunger 6 in the shifter valve mechanism moves into the deeper notch I or H in the shifter rod 11, which permits the lower ball of the valve 5 to seat and shut off the flow of fluid into the clutch cylinder C. The plunger rises far enough to move away from the upper ball of the valve 5. This connects the chamber 4 to the atmosphere to bleed the clutch cylinder through the pipe 15 and permits the clutch to engage.

While the invention has been described with reference to a preferred embodiment illustrated, it is to be understood that this is not to be considered limiting, and that applicant reserves the right to all such other embodiments and modifications as fall within the principles of this invention and the scope of the appended claims.

I claim:

1. The combination with a clutch cylinder for operating a clutch for connecting an engine shaft to and disconnecting it from a transmission mechanism, means for supplying fluid under pressure to said cylinder, conduit means connecting said means of fluid supply to said cylinder, a valve in said conduit, throttle actuating means controlling said valve, said valve being open when the throttle is in closed position and adapted to be moved by said throttle actuating means into closed position to shut off the supply of fluid when the throttle is opened; a second valve in communication with said clutch cylinder and normally closed and actuated into open position by said throttle actuating means as it is moved to open said throttle, a variable volume supply reservoir receiving fluid passing through said second mentioned valve in sufficient volume to permit said clutch to move just clear of engaging position, and means for further reducing the pressure in said clutch cylinder upon an increase in speed of the engine.

2. In combination with a clutch cylinder employed with a gear shift mechanism having neutral, low and reverse, and intermediate and high positions, a source of fluid supply, a conduit connecting the fluid supply to said clutch cylinder, a normally open shifter valve and a normally open throttle controlled valve in said conduit for normally supplying fluid to said clutch cylinder when the mechanism is in neutral, low or reverse, and the throttle is closed; a discharge valve connected to said conduit, and an intermediate and high shifter rod for closing said first mentioned valve and for opening said discharge valve when the gear shift mechanism is in its intermediate or high position.

3. In combination with a clutch cylinder employed with a gear shift mechanism having neutral, low and reverse, and intermediate and high positions, a source of fluid supply, a conduit connecting the fluid supply to the clutch cylinder, a normally open shifter valve and a normally open throttle controlled valve in said conduit for normally supplying fluid to said clutch cylinder when the mechanism is in neutral, low or reverse, and the throttle is closed; a discharge valve connected to said conduit at a point between said throttle controlled valve and said clutch cylinder, and means for opening said discharge valve by movement of said gear shift mechanism into intermediate or high position.

4. In combination with a clutch cylinder employed with a gear shift mechanism including neutral, low and reverse, and intermediate and high positions, a source of fluid supply, a conduit connecting the fluid supply to said clutch cylinder, a throttle, a normally open shifter valve and a normally open throttle controlled valve in said conduit for normally supplying fluid to said pressure cylinder, when the mechanism is in neutral, low or reverse and the throttle is closed, means for closing said throttle controlled valve upon operation of said throttle, a discharge valve connected to said conduit at a point between said throttle controlled valve and said clutch cylinder, and means operated by said gear shift mechanism when moving into intermediate or high position to open said discharge valve.

5. In a mechanism for controlling a clutch interposed between an engine and a gear shift mechanism, a clutch cylinder, a source of supply, conduits connecting said source of supply to said clutch cylinder, a shifter valve mechanism including a normally open supply valve and a normally closed discharge valve, an intermediate and high shifter rod controlling said valves and moving said valves into closed and open position respectively upon movement into intermediate and high positions, a conduit connecting said discharge valve to said clutch cylinder, a throttle operating means, a throttle controlled valve mechanism, including a normally open valve connecting said supply valve to said clutch cylinder and a normally closed discharge valve and adapted to be moved into closed and open positions respectively by said throttle operating means, a variable volume reservoir connected to said latter discharge valve of sufficient volume to reduce the volume of said clutch cylinder to move the clutch just clear of engagement, and a governor controlled discharge valve for withdrawing fluid from said variable volume reservoir upon a predetermined increase in speed of the engine to bleed said clutch cylinder to engage the clutch.

6. In a mechanism for controlling the engagement of a clutch interposed between an engine and a gear shift mechanism, a clutch cylinder, means for supplying fluid to said cylinder in neutral, low and reverse positions of said gear shift mechanism, a throttle controlled valve for cutting off the supply to said cylinder, a variable volume cylinder, a second throttle controlled valve for connecting said variable volume cylinder to said clutch cylinder to reduce the volume of fluid in the latter to move the clutch just short of engagement, and a governor controlled valve for discharging fluid from said clutch cylinder when the engine attains a certain predetermined speed.

7. In a mechanism for controlling the engagement of a clutch interposed between an engine and a gear shift mechanism, a clutch cylinder, means for supplying fluid to said cylinder in neutral, low and reverse positions of said gear shift mechanism, a throttle controlled valve for cutting off the supply to said cylinder, a variable volume cylinder, a second throttle controlled valve for connecting said variable volume cylinder to said clutch cylinder to reduce the volume of fluid in the latter to move the clutch just short of engagement, a governor controlled valve for discharging fluid from said clutch cylinder when the engine attains a certain predetermined speed; an intermediate and high shifter rod, and valve means, controlled by said shifter rod in intermediate or high position for cutting off the supply to said clutch cylinder and discharging fluid from the clutch cylinder.

8. In a mechanism for controlling the supply of fluid to and discharge of fluid from a clutch cylinder for operating a clutch between an engine shaft and transmission mechanism, throttle actuating means, a source of fluid supply supplying fluid to said clutch cylinder when said throttle actuating means is in non-operated position, means operated by said throttle actuating means as an incident to the opening of the throttle for releasing fluid from said clutch cylinder in sufficient amount to move said clutch into a position just clear of engagement, and means operated as an incident to an increase in the speed of the engine for releasing a sufficient amount of fluid from said clutch cylinder to engage said clutch.

9. In a clutch controlling mechanism for controlling a clutch connecting the shaft of an engine to a transmission mechanism through a gear shift mechanism including low and higher speed change mechanism, pressure means normally holding the clutch disengaged, resilient means for moving the clutch into engagement, said resilient means opposing the action of said pressure means, a throttle mechanism, means operable in low speed position of the gear shift mechanism for diminishing the effect of said pressure means to permit said resilient means to move the clutch just clear of engaging position as the throttle mechanism is operated and means for further diminishing the effect of said pressure means to permit said resilient means to move the clutch into engagement as the engine attains a predetermined speed.

10. In a clutch controlling mechanism for controlling a clutch connecting the shaft of an engine to a transmission mechanism through a gear shift mechanism including low and higher speed change mechanism, pressure means normally holding the clutch disengaged, resilient means for moving the clutch into engagement, said resilient means opposing the action of said pressure means, a throttle mechanism, means operable in low speed position of the gear shift mechanism for diminishing the effect of said pressure means to permit said resilient means to move the clutch just clear of engaging position as the throttle mechanism is operated, means for further diminishing the effect of said pressure means to permit said resilient means to move the clutch into full engagement as the engine attains a predetermined speed, and means operated by movement of the gear shift mechanism into the higher speed position to permit said resilient means to move the clutch into full engagement upon completion of said movement.

GORDON M. SCHANTZ.

REFERENCES CITED

The following references are of record in the file of this patent:

UNITED STATES PATENTS

| Number | Name | Date |
| --- | --- | --- |
| 2,090,152 | Porter | Aug. 17, 1937 |
| 2,094,135 | Porter | Sept. 28, 1937 |
| 2,144,074 | Maybach | Jan. 17, 1939 |
| 2,164,865 | Keiper | July 4, 1939 |
| 2,259,599 | Zeller | Oct. 21, 1941 |
| 2,374,869 | Leukhardt | May 1, 1945 |